(12) United States Patent
Shigeno et al.

(10) Patent No.: US 7,764,270 B2
(45) Date of Patent: Jul. 27, 2010

(54) COMPUTER MOUSE

(75) Inventors: Yasuhiro Shigeno, Osaka (JP); Naoya Takehara, Osaka (JP); Keiji Mine, Osaka (JP); Kosuke Sasada, Osaka (JP)

(73) Assignee: Hosiden Corporation, Yao-shi Osaka (JP)

( * ) Notice: Subject to any disclaimer, the term of this patent is extended or adjusted under 35 U.S.C. 154(b) by 1142 days.

(21) Appl. No.: 11/401,230

(22) Filed: Apr. 11, 2006

(65) Prior Publication Data

US 2006/0250366 A1 Nov. 9, 2006

(30) Foreign Application Priority Data

May 9, 2005 (JP) .............................. 2005-136127

(51) Int. Cl.
*G06F 3/033* (2006.01)
(52) U.S. Cl. ..................................................... 345/163
(58) Field of Classification Search ................... 345/163
See application file for complete search history.

(56) References Cited

U.S. PATENT DOCUMENTS

| 5,199,173 | A  | * | 4/1993  | Hegemann et al. | ............. 30/49 |
| 6,304,249 | B1 | * | 10/2001 | Derocher et al. | ............ 345/163 |
| 6,462,937 | B1 |   | 10/2002 | Liao            |                   |
| 6,600,479 | B1 | * | 7/2003  | Smith et al.    | ................. 345/163 |
| 6,654,235 | B2 | * | 11/2003 | Imsand          | ................... 361/679.09 |
| 2002/0126087 | A1 |   | 9/2002  | Katsuya    |                   |
| 2003/0230680 | A1 | * | 12/2003 | Doan       | ...................... 248/118.5 |

FOREIGN PATENT DOCUMENTS

| EP | 1 087 328 A1 | 3/2001 |
| JP | 2001 034405 A | 2/2001 |
| JP | 2002-215324 | 8/2002 |
| WO | WO 98/16170 A | 4/1998 |

* cited by examiner

*Primary Examiner*—Richard Hjerpe
*Assistant Examiner*—Sahlu Okebato
(74) *Attorney, Agent, or Firm*—Bacon & Thomas, PLLC (57) ABSTRACT

The invention relates to a computer mouse which is one kind of coordinate input devices for a computer, and more particularly to a computer mouse which is suitably used for a portable computer. The mouse has: a thin mouse case in which an upper face portion opposing a palm when the mouse is used is formed into a downward-concaved shape; and a plate-like member having a shape which extends along the downward-concaved upper face of the mouse case, and the plate-like member is attachable to the downward-concaved upper face of the mouse case in both an upward-convex direction and a downward-concave direction. When the mouse is to be used, the plate-like member is attached in the upward-convex manner to the downward-concaved upper face of the mouse case, and, when the mouse is to be carried, the plate-like member is attached in the downward-concave manner to the downward-concaved upper face of the mouse case, thereby realizing compaction of the mouse in which the original shape and size of the mouse are reproducible.

7 Claims, 9 Drawing Sheets

COMPUTER MOUSE

BACKGROUND OF THE INVENTION

1. Field of the Invention

The present invention relates to a computer mouse (hereinafter, often referred to simply as a "mouse") which is one kind of coordinate input devices for a computer, and more particularly to a mouse which is suitably used for a portable computer.

2. Description of the Prior Art

Such a device is called a mouse because the shape and size which can be easily held by a hand, and which are designed so as to comfortably fit to the palm, and to be easily operated are similar to a house mouse. Along with the popularization of portable personal computers, a mouse is requested to be suitable for a mobile use. In order to meet the request, conventionally, small or thin mice which completely fit in a hand have been provided (for example, see Japanese Patent Application Laying-Open No. 2002-215324). Furthermore, mice which are to be connected to a computer body in accordance with the USB standard are widely used. A cable having a USB connector plug at the tip end is connected to such a mouse, so that the mouse can be connected to a USB connector socket which is disposed on the computer body, and which is commonly used for a keyboard, and other peripheral devices. In order to ensure the degree of freedom in the use of the mouse, in general, the connected cable has a length of a relative large value, or about 1 to 2 m. When such a mouse with a cable is to be carried, usually, the cable is treated by being wound around the mouse, or by being gathered into a bundle by a rubber band, string, or a bundling band.

SUMMARY OF THE INVENTION

A problem which is to be solved by the invention is that, since the portability of a conventional mouse is improved by miniaturizing or thinning the mouse, the original shape and size of the mouse which can be easily held by a hand, and which comfortably fits to the palm are impaired, and the portability cannot be improved without impairing the operability of the mouse. In the cable treatment method in which a cable is wound around a mouse, because of exposure of the whole length of the cable from the surface of the mouse, and the shape of the mouse itself, the cable is easily loosened and tangled with another article or the cable itself. Also in another cable treatment method in which the cable is gathered into a bundle by a rubber band, string, a bundling band, or the like, the cable is simply gathered outside the mouse, and hence the cable bundle is easily tangled with another article. These are not preferable in the viewpoint of the portability of the mouse, and constitute another problem which is to be solved by the invention.

According to the invention, in order to improve the portability without impairing the operability of a mouse, the mouse comprises: a thin mouse case in which an upper face portion opposing a palm when the mouse is used is formed into a downward-concaved shape; and a plate-like member having a shape which extends along the downward-concaved upper face of the mouse case, and the plate-like member is attachable to the downward-concaved upper face of the mouse case in both an upward-convex direction and a downward-concave direction. When the mouse is to be used, the plate-like member is attached in the upward-convex manner to the downward-concaved upper face of the mouse case, thereby configuring the mouse so that it has the original shape and size of the mouse which can be easily held by a hand, comfortably fits to the palm, and is easily operated, and which has a cavity between the plate-like member and the downward-concaved upper face of the mouse case. When the mouse is to be carried, the plate-like member is attached in the downward-concave manner to the downward-concaved upper face of the mouse case, thereby configuring the mouse in which the cavity between the plate-like member and the downward-concaved upper face of the mouse case is eliminated and the mouse is easy to carry, the whole shape is thinned, and which has a concave portion in a middle portion of the upper face.

In the invention, preferably, shapes of the downward-concaved upper face of the mouse case and the plate-like member are same arch shapes which are overlappable with each other in a close contact state. In the case where this configuration is added, when the mouse is to be used, the upward-convexed upper face of the mouse case which opposes the palm has an arch-like shape, and more comfortably fits to the palm.

Preferably, an engaging concave portion or an engaging convex portion is disposed in plural peripheral places of one of the downward-concaved upper face of the mouse case and the plate-like member, and an engaging convex portion or an engaging concave portion which is fittable with the engaging concave portion or the engaging convex portion is disposed in plural peripheral places of another one of the downward-concaved upper face and the plate-like member. When this configuration is employed, the plate-like member can be attached to the downward-concaved upper face of the mouse case in both the upward-convex direction and the downward-concave direction and in a state where rattle is not caused and fixation is surely performed, and the attached state of the plate-like member can be easily changed.

According to the invention, compaction of the mouse in which the original shape and size of the mouse are reproducible can be realized, and hence the portability can be improved without impairing the operability of the mouse. The mouse which is to be carried has a concave portion in a middle portion of the upper face. When a cable is wound around the middle portion of the upper face, therefore, the cable is hardly loosened and tangled with another article or the cable itself as compared with a conventional mouse. Consequently, the mouse can be carried in a state where the cable is adequately treated without causing any inconvenience, and the portability of the mouse can be further improved.

BRIEF DESCRIPTION OF THE DRAWINGS

FIG. 7 is a view showing the appearance of the mouse,

1 mouse case
4 rear cover plate (downward-concaved upper face of mouse case)
11 cable
14 plate-like member
15a engaging concave portion (on the side of mouse case)
15b engaging convex portion (on the side of plate-like member)
16a engaging convex portion (on the side of mouse case)
16b engaging concave portion (on the side of plate-like member)

DETAILED DESCRIPTION OF THE PREFERRED EMBODIMENT

Figure 1:
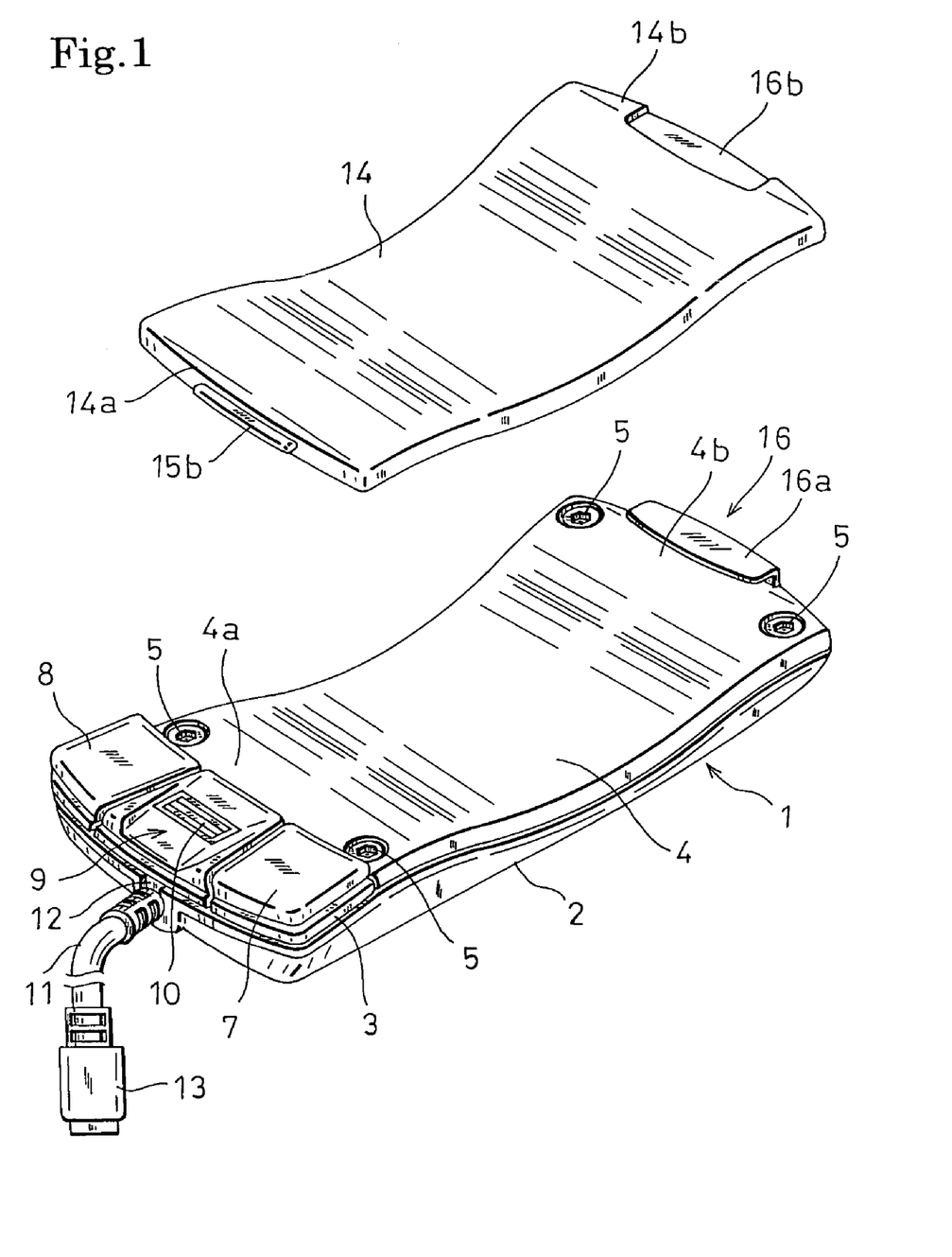
FIG. 1 is an external perspective view showing the configuration of a mouse which is an embodiment of the invention.
Figure 7A:
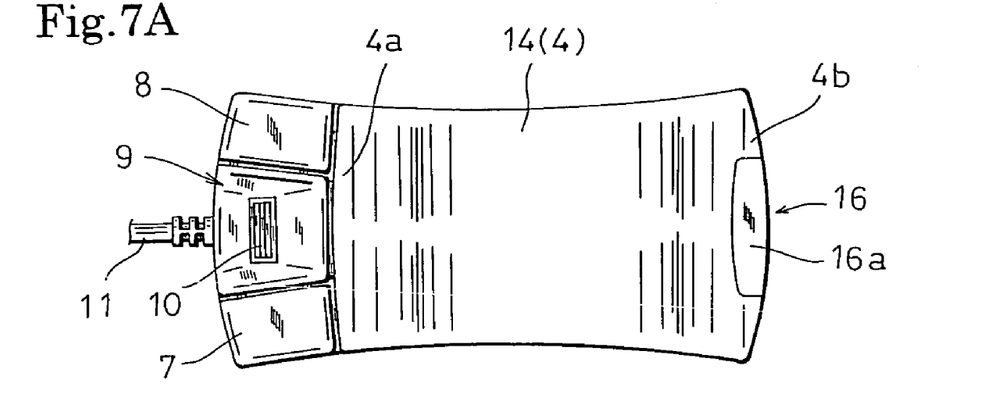
FIG. 7A is a plan view of the mouse which is common in the use condition and the carry condition.
Figure 7B:
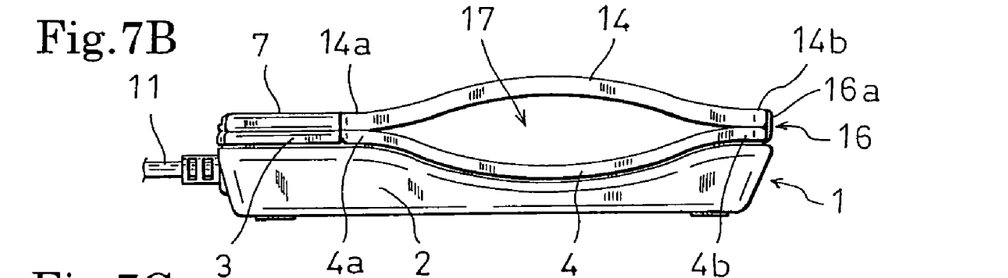
FIG. 7B is a side view of the mouse in the use condition.
Figure 7C:
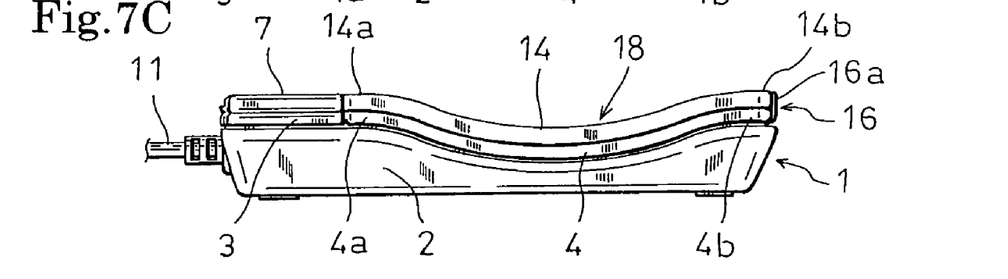
FIG. 7C is a side view of the mouse in the carry condition.
Figure 7D:
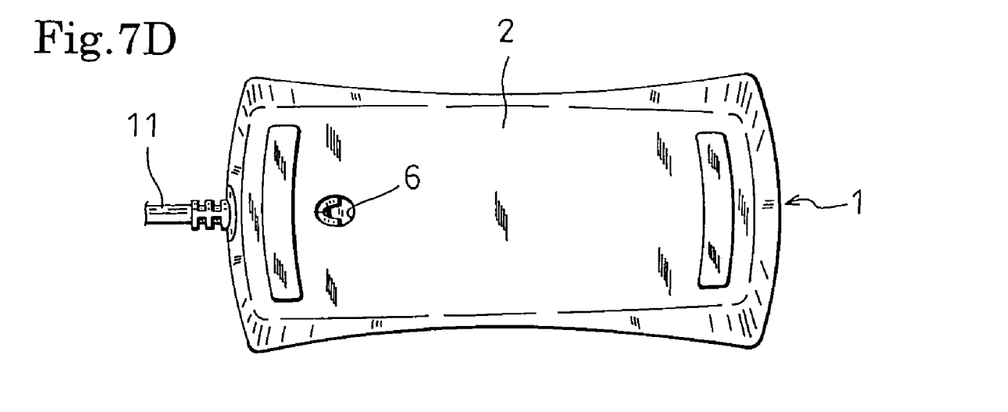
FIG. 7D is a bottom view of the mouse which is common in the use condition and the carry condition.

Hereinafter, an embodiment of the invention will be described with reference to the accompanying drawings. FIG. 1 is an external perspective view showing the configuration of a mouse which is the embodiment of the invention. FIG. 7 is a view showing the appearance of the mouse, FIG. 7A is a plan view of the mouse which is common in the use condition and the carry condition, FIG. 7B is a side view of the mouse in the use condition, FIG. 7C is a side view of the mouse in the carry condition, and FIG. 7D is a bottom view of the mouse which is common in the use condition and the carry condition. The embodiment will be described on the assumption that, in the case where the mouse is operated by the right hand, the fingertip side is a mouse front side, the wrist side is a mouse rear side, the thumb side is a mouse left side, and the little finger side is a mouse right side.

In FIGS. 1 and 7, 1 denotes a thin mouse case which has a substantially parallelepiped rectangular shape, in which the thickness of the whole suppressed. The mouse case comprises: a shallow tray-like lower case 2 which is made of a resin material, in which low-profile side plates are raised at an obtuse angle that is slightly larger than a right angle, respectively from side edges of a flat bottom plate (opposing the upper face of a desk or a mouse pad when the mouse is used) that extends in the anteroposterior direction, and that has a substantially rectangular shape; a front cover plate 3 which is made of a resin material, which covers a front end portion (corresponding to the fingertips when the mouse is used) of the upper face of the lower case 2, and which has a substantially rectangular shape that laterally elongates; and a rear cover plate 4 which is made of a resin material, which covers the upper face (corresponding to the palm when the mouse is used) of the lower case 2 that is behind the front cover plate 3, and which has a substantially rectangular shape that extends in the anteroposterior direction. The front cover plate 3 is fitted and fixed to the lower case 2, and the rear cover plate 4 is detachably fastened and fixed at the four corners to the lower case 2 via screws 5. In the mouse case 1, components which are necessary for functioning as a mouse, or an electronic circuit board, an optical coordinated position detecting mechanism, and two push-button type switches are housed. In the mouse of the embodiment, a fingerprint authenticating mechanism and the like are further housed. The optical coordinated position detecting mechanism has: a light emitting device (for example, an LED) which emits detection light from a detection hole 6 (see FIG. 7D) disposed in a middle portion of the front side of the bottom face of the mouse case 1; a light receiving device which receives reflected light that is formed by reflecting the detection light from the light emitting device by the upper face of the desk or the mouse pad; and the like, and is configured so as to optically detect the moving distance and direction (coordinate position) of the mouse. Each of the two push-button type switches has an operation button (push button) having a substantially parallelepiped rectangular shape. In one of the switches, the operation button 7 is attached in a vertically movable manner to a left end portion of the upper face of the front cover plate 3, and protrudingly disposed on a front left corner portion of the upper face of the mouse case 1. In the other switch, the operation button 8 is attached in a vertically movable manner to a right end portion of the upper face of the front cover plate 3, and protrudingly disposed on a front right corner portion of the upper face of the mouse case 1. A fingerprint detecting portion 9 which protrudes between the right and left operation buttons 8, 7 is formed integrally on a middle portion of the upper face of the front cover plate 3. The fingerprint authenticating mechanism is configured so as to detect the fingerprint of the user through a slit-like detection hole 10 which is disposed in a middle portion of the fingerprint detecting portion 9 between the right and left operation buttons 8, 7 of the mouse case 1. One end of a cable 11 through which signals and data are sent and received between the electronic circuit board and a computer body, and an electric power for the mouse is supplied is connected to the electronic circuit board. The cable 11 is drawn out to the outside of the mouse case 1 from a cable draw-out port 12 disposed in a middle portion of the front side face of the mouse case 1. The cable 11 which is drawn out to the outside of the mouse case 1 is relatively long, or has a total length of about 1.5 m. A USB connector plug 13 corresponding to a USB connector socket which is disposed on the computer body is disposed at the tip end of the cable 11.

Each of the right and left side plates of the lower case 2 in the range where the upper face is covered by the rear cover plate 4 is formed so that an upper end portion is cut away by a downward-concaved arcuate cutting face of a large radius of curvature, and the height is lowest at the anterior-posterior middle, and gradually increased as advancing toward the front and rear ends so that front and rear end portions are horizontal and flush with the heights of the right and left side plates of the lower case 2 in the range where the upper face is covered by the front cover plate 3. In accordance with this, in a plan view, each of the upper edges of the right and left side plates of the lower case 2 in the range where the upper face is covered by the rear cover plate 4 has an inward-convexed arcuate shape which is bilaterally symmetrical, and which has a large radius of curvature, and the distance between the upper edges is narrowest at the anterior-posterior middle, and gradually increased as advancing toward the front and rear ends so as to be widest in front and rear end portions. In accordance with this, in order to allow the right and left side edges of the rear cover plate 4 to be joined along the upper edges of the right and left side plates of the lower case 2 in the range where the upper face is covered by the rear cover plate 4, in a side view, the rear cover plate 4 is formed into an arch-like shape in which the front and rear end portions have horizontal portions 4a, 4b, and a portion between the portions are bent into a downward-concaved arcuate shape of a large radius of curvature, and, in a plan view, formed into a substantially drum-like shape in which the lateral width is smallest at the anterior-posterior middle, and gradually increased as advancing toward the front and rear ends so as to be largest in front and rear end portions. Therefore, the upper face portion (the rear cover plate 4) opposing the palm when the mouse is used is formed into a downward-concaved arch-like shape (inverted arch-like shape), and the mouse case 1 is configured to be thin as a whole. In the mouse case, at the anterior-posterior middle, the height of the side faces (thickness) is lowest (thinnest), and the lateral width is smallest.

In FIGS. 1 and 7, 14 denotes one plate-like member which is made of a resin material, which is formed completely independently from the mouse case 1, and which extends along the surface of the rear cover plate 4 that is the downward-concaved upper face of the mouse case 1. In order to allow the plate-like member to exactly overlap with the surface of the mouse case 1 in a close contact state, in the same manner as the rear cover plate 4, the plate-like member is formed, in a side view, into an arch-like shape in which the front and rear end portions have horizontal portions 14a, 14b, and a portion between the portions are bent into a downward-concaved arcuate shape of a large radius of curvature, and, in a plan view, formed into a substantially drum-like shape in which the lateral width is smallest at the anterior-posterior middle, and gradually increased as advancing toward the front and rear ends so as to be largest in the front and rear end portions.

Figure 8:
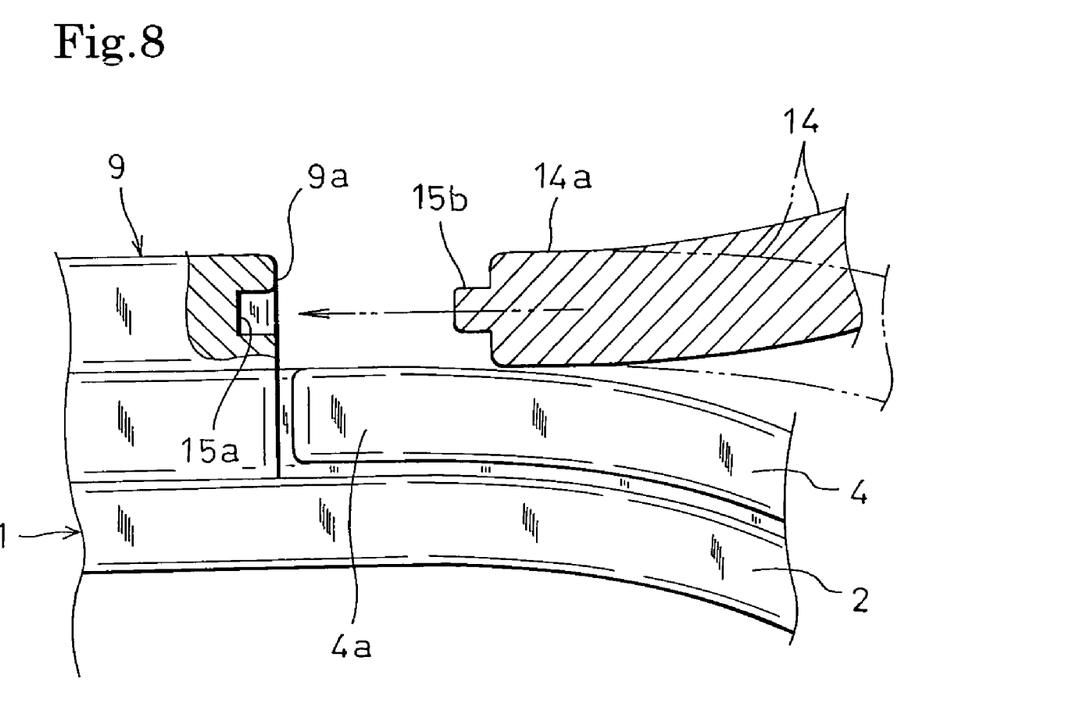
FIG. 8 is a view showing a structure of attaching a front portion of a plate-like member to a mouse case.
Figure 9:
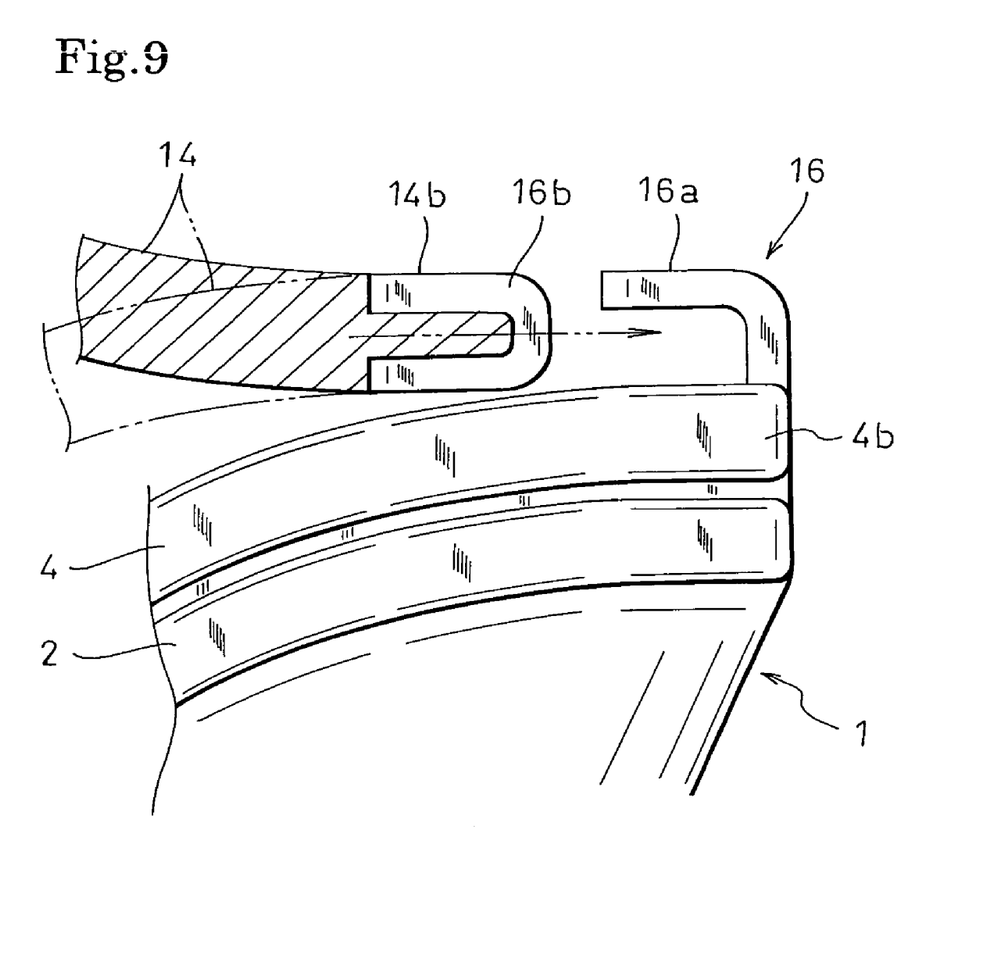
FIG. 9 is a view showing a structure of attaching a rear portion of the plate-like member to the mouse case.

FIG. 8 is a view showing a structure of attaching the front portion of the plate-like member to the mouse case, and FIG. 9 is a view showing a structure of attaching the rear portion of the plate-like member to the mouse case.

As shown in FIGS. 1 and 7 to 9, a horizontally lateral engaging concave portion 15a is disposed in a rear side face 9a of the fingerprint detecting portion 9 which is raised approximately vertically from a middle portion of the front end of the rear cover plate 4 of the mouse case 1, and a horizontally lateral front engaging convex portion 15b which can be fitted from the rear side into the engaging concave portion 15a is disposed at a middle portion of the front end face of the plate-like member 14 which opposes the rear side face 9a of the fingerprint detecting portion 9. A fixing piece 16 which is made of a resin material is disposed on the mouse case 1. The lower end of the fixing piece is secured to a middle portion of a rear side plate of the lower case 2, and an upper end portion of the piece protrudes from the surface of a middle portion of the rear end of the rear cover plate 4. The fixing piece 16 is formed into a hook-like shape in which the upper end portion is raised approximately vertically from the middle portion of the rear end of the rear cover plate 4 so as to oppose the rear side face 9a of the fingerprint detecting portion 9, and the upper end is forward perpendicularly bent so as to elongate along the surface of the rear horizontal portion 14b of the plate-like member 14. A hook-like rear engaging convex portion 16a configured by the hook-like upper end portion of the fixing piece 16 is disposed on the surface side of the middle portion of the rear end of the rear cover plate 4 of the mouse case 1. On the other hand, a rear engaging concave portion 16b which has a C-like section shape, and which can be fitted from the front side into the engaging convex portion 16a is disposed in the middle portion of the rear end of the plate-like member 14, so that the plate-like member 14 can be detachably attached to the surface side of the rear cover plate 4 of the mouse case 1 in both the upward-convex direction (arch-like shape) and the downward-concave direction (inverted arch-like shape).

Figure 2:
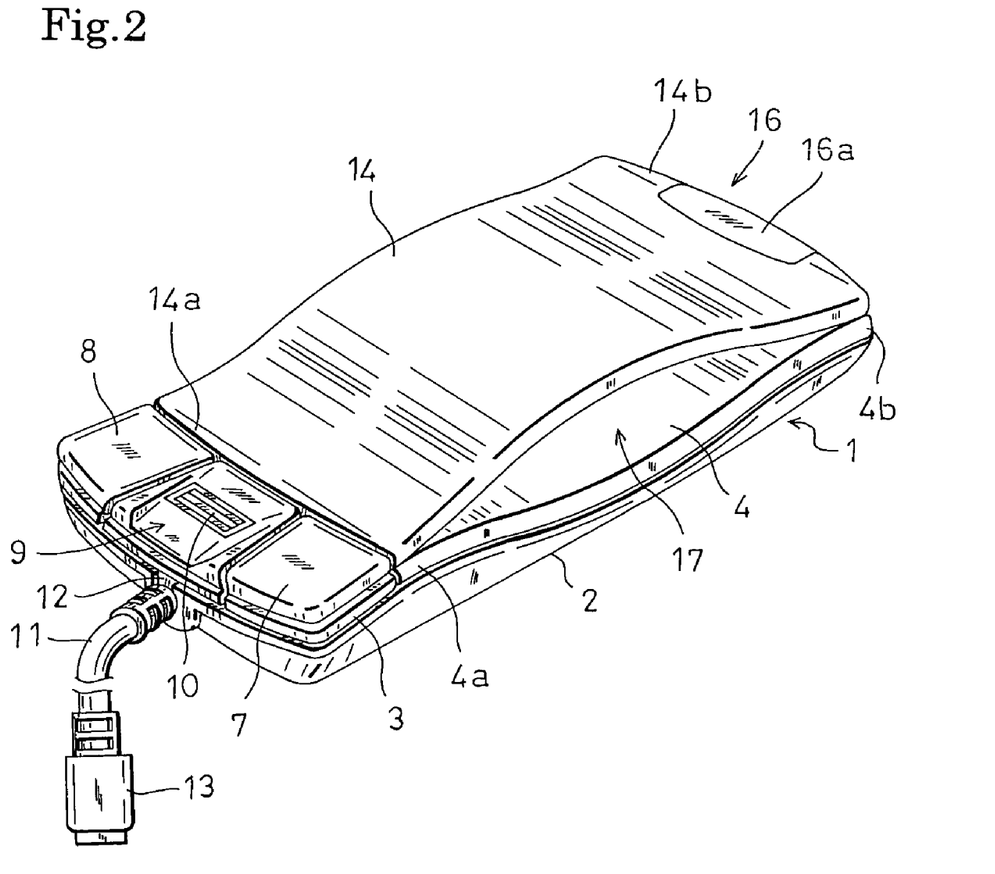
FIG. 2 is an external perspective view showing the mouse in a use condition.

When the thus configured mouse of the embodiment is to be used, the downward-concaved plate-like member 14 shown in FIG. 1 is inverted to an upward-convex shape, the middle portion (the portion where the thickness is reduced by the rear engaging concave portion 16b) of the rear end of the plate-like member 14 is inserted from the front side into the inner side of the hook-like upper end portion of the fixing piece 16, and the rear engaging concave portion 16b is fitted to the engaging convex portion 16a. In this state, the front portion of the plate-like member 14 is pressed down while the plate-like member is rearward pushed, whereby the fixing piece 16 is rearward bent, and the plate-like member 14 is fitted between the right and left operation buttons 8, 7 and the fingerprint detecting portion 9, and the fixing piece 16. When the pushing force on the plate-like member 14 is canceled in this state, the fixing piece 16 elastically returns, and the returning force causes the plate-like member 14 to be forward pushed, so that the middle portion of the front end face is joined to the rear side face 9a of the fingerprint detecting portion 9, and the front engaging convex portion 15b is fitted from the rear side to the front engaging concave portion 15a. As a result of this one-touch simple fitting operation between the rear engaging convex portion 16a and the rear engaging concave portion 16b, and the front engaging concave portion 15a and the front engaging convex portion 15b, the plate-like member 14 is attached in the upward-convexed manner as shown in FIGS. 2 and 7B to the surface side of the rear cover plate 4 which is the downward-concaved upper face of the mouse case 1, in a state where the rear faces of the front- and rear-end horizontal portions 14a, 14b of the plate-like member 14 are joined with the front- and rear-end horizontal portions 4a, 4b of the rear cover plate 4, and surely fixed thereto without rattling, thereby configuring the mouse in a use condition. In the mouse in the use condition, the upper face of the mouse case 1 opposing the palm is formed into the upward-convexed shape by the plate-like member 14, and the original shape and size of the mouse which can be easily held by a hand, and which comfortably fits to the palm are attained, thereby facilitating the operation. The upward-convexed upper face of the mouse case 1 which opposes the palm is formed into an arch-like shape by the plate-like member 14 to be further comfortably fit to the palm, and smoothly continuous in a stepless manner to the upper faces of the right and left operation buttons 8, 7, thereby further facilitating the operation. In the mouse in the use condition, a cavity 17 is formed between the plate-like member 14 and the rear cover plate 4 of the mouse case 1.

In the mouse in the use condition, the USB connector plug 13 at the tip end of the cable 11 attached to the mouse case 1 is connected to the USB connector socket disposed on the computer body, whereby connection with the computer body can be conducted in accordance with the USB standard. A hand is placed on the upper face of the mouse which is in the use condition, and which is connected to the computer body, and the mouse is then moved on the upper face of the desk or the mouse pad. The moving distance and direction (coordinate position) of the mouse are detected by the optical coordinated position detecting mechanism, and coordinated position information which is used for moving a mouse cursor displayed on a computer screen in accordance with the movement of the mouse is supplied to the computer body. In a state where the mouse cursor is moved to a designated position on the screen, the right and left operation buttons 8, 7 of the two push-button type switches are adequately operated by the fingertips of the index finger, the middle finger, or the medicinal finger of the hand holding the mouse in the use condition, thereby inputting various operation signals into the computer body correspondingly with the screen. As a result, the computer is operated. In the mouse of the embodiment, the function as a mouse is allowed to operate the computer only when fingerprint data collected from the fingerprint detecting portion 9 are collated with predetermined stored fingerprint data by the fingerprint authenticating mechanism, and they coincide with each other.

The upward-convexed plate-like member 14 can be detached from the mouse case 1 of the mouse in the use condition in the following manner. In the order reverse to that of attachment, the plate-like member 14 is rearward pushed, the middle portion of the front end face of the plate-like member 14 is rearward detached from the rear side face 9a of the fingerprint detecting portion 9 with rearward bending of the fixing piece 16, whereby the front engaging convex portion 15b is rearward disengaged from the front engaging concave portion 15a. In this state, the plate-like member 14 is forward pulled while the front portion is pulled up, and the middle portion (the portion where the thickness is reduced by the rear engaging concave portion 16b) of the rear end of the plate-like member 14 is forward pulled away from the inner side of the hook-like upper end portion of the fixing piece 16, so that the rear engaging concave portion 16b is forward disengaged from the rear engaging convex portion 16a. As a result of this one-touch simple disengaging operation between the front engaging concave portion 15a and the front engaging convex portion 15b, and the rear engaging convex portion 16a and the rear engaging concave portion 16b, the plate-like member 14 can be detached from the mouse case 1.

Figure 3:
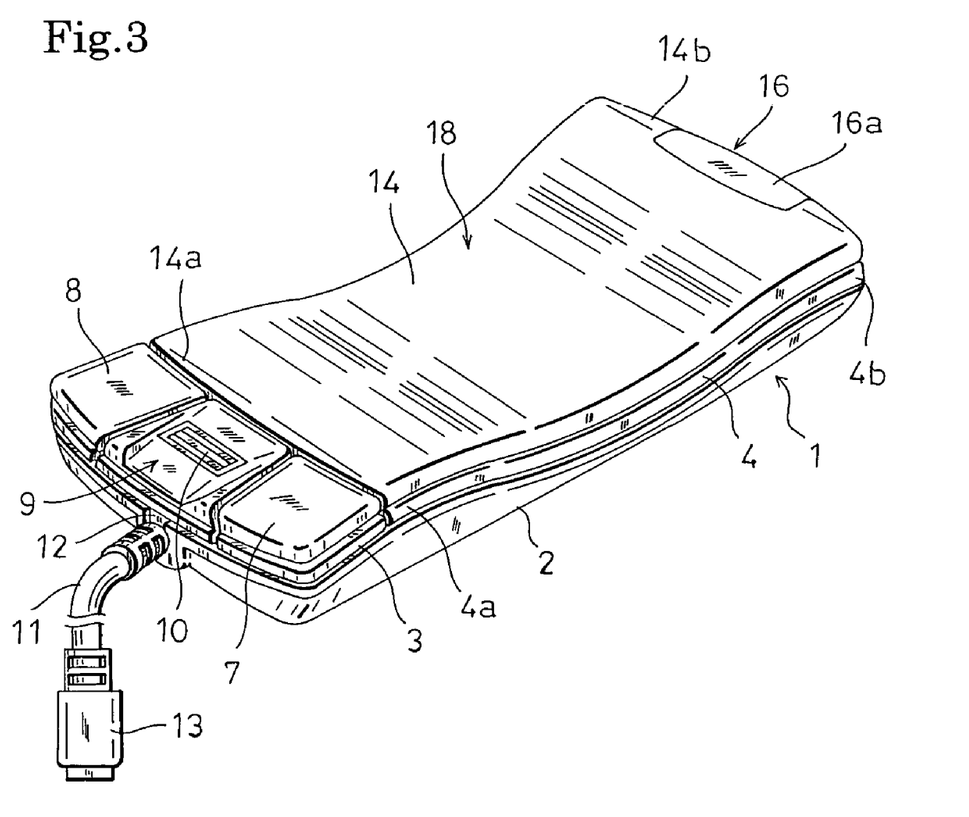
FIG. 3 is an external perspective view showing the mouse in a carry condition.

For example, the thus configured mouse of the embodiment is accommodated and carried together with a portable personal computer in a bag in the following manner. On the downward-concaved plate-like member 14 shown in FIG. 1, the one-touch simple fitting operation between the rear engaging convex portion 16a and the rear engaging concave portion 16b, and the front engaging concave portion 15a and the front engaging convex portion 15b of the plate-like member 14 is conducted strictly in the same manner as that in the case of the upward-convexed plate-like member 14, whereby, as shown in FIGS. 3 and 7C, the plate-like member 14 is joined with exactly overlapping with each other to the surface side of the rear cover plate 4 which is the downward-concaved upper face of the mouse case 1, in a state where the front face of the rear face of the plate-like member 14 extending from the front-end horizontal portion 14a to the rear-end horizontal portion 14b is in close contact with the front face of the surface of the rear cover plate 4 extending from the front-end horizontal portion 4a to the rear-end horizontal portion 4b, and attached thereto in a downward-concave manner in a state where they are surely fixed to each other without rattling, thereby configuring a mouse in the carry condition. In the mouse in the carry condition, the cavity 17 which is formed between the upward-convexed plate-like member 14 and the rear cover plate 4 of the mouse case 1 of the mouse in the use condition is eliminated, and the whole mouse is thin and does not require a large storage space, and hence easy to carry. A concave 18 which is identical with the surface shape of the downward-concaved plate-like member 14 is formed in the middle portion of the upper face of the mouse in the carry condition. Although the whole is thin, the thickness (height) is thinnest (lowest) in the anterior-posterior middle, and gradually thickened (heightened) as advancing toward the front and rear ends so as to be thickest (highest) in front and rear end portions. Furthermore, the lateral width is smallest at the anterior-posterior middle, and gradually increased as advancing toward the front and rear ends so as to be largest in front and rear end portions. Also in the case where the downward-concaved plate-like member 14 is to be detached from the mouse case 1 of the mouse in the carry condition, a one-touch simple disengaging operation between the front engaging concave portion 15a and the front engaging convex portion 15b, and the rear engaging convex portion 16a and the rear engaging concave portion 16b is conducted strictly in the same manner as that in the case where the upward-convexed plate-like member 14 is detached from the mouse case 1 of the mouse in the use condition, whereby the plate-like member 14 can be detached from the mouse case 1.

As described above, the mouse of the embodiment comprises: the thin mouse case 1 in which the rear cover plate 4 which is the upper face portion opposing a palm when the mouse is used is formed into a downward-concaved shape; and the plate-like member 14 having a shape which extends along the surface of the rear cover plate 4 that is the downward-concaved upper face of the mouse case 1, and the plate-like member 14 is attachable to the surface of the rear cover plate 4 which is the downward-concaved upper face of the mouse case 1 in both the upward-convex direction and the downward-concave direction. When the mouse is to be used, the plate-like member 14 is attached in the upward-convex manner to the surface of the rear cover plate 4 which is the downward-concaved upper face of the mouse case 1, thereby configuring the mouse so that it has the original shape and size of the mouse which can be easily held by a hand, comfortably fits to the palm, and is easily operated, and which has the cavity 17 between the plate-like member 14 and the surface of the rear cover plate 4 which is the downward-concaved upper face of the mouse case 1. When the mouse is to be carried, the plate-like member 14 is attached in the downward-concave manner to the surface of the rear cover plate 4 which is the downward-concaved upper face of the mouse case 1, thereby configuring the mouse in which the cavity 17 between the plate-like member 14 and the surface of the rear cover plate 4 which is the downward-concaved upper face of the mouse case 1 is eliminated, so that the whole shape is thinned and the mouse is easy to carry, and which has the concave portion 18 in the middle portion of the upper face. Compaction of the mouse in which the original shape and size of the mouse are reproducible can be realized, and hence the portability can be improved without impairing the operability of the mouse.

Figure 4:
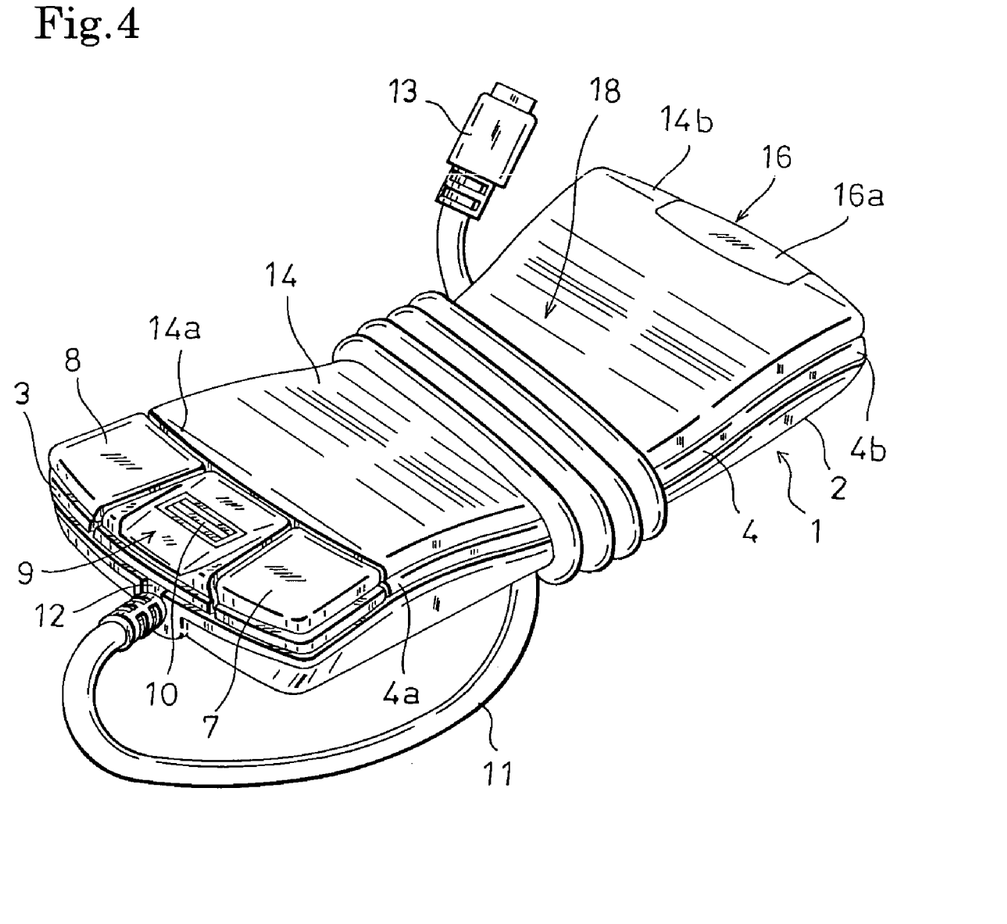
FIG. 4 is an external perspective view showing a method of treating a cable when the mouse is to be carried.

FIG. 4 is an external perspective view showing a method of treating the cable when the mouse is to be carried. In the mouse in the carry condition, the concave 18 is formed in the middle portion of the upper face as described above, the middle portion of the mouse is small in thickness, and the lateral width is narrowed. When, as shown in FIG. 4, a substantially whole length of the cable 11 is wound around the middle portion of the mouse, the cable 11 is hardly loosened and tangled with another article or the cable 11 itself as compared with a conventional mouse. Consequently, the mouse can be carried in a state where the cable 11 is adequately treated without causing any inconvenience, and the portability of the mouse can be further improved.

Figure 5:
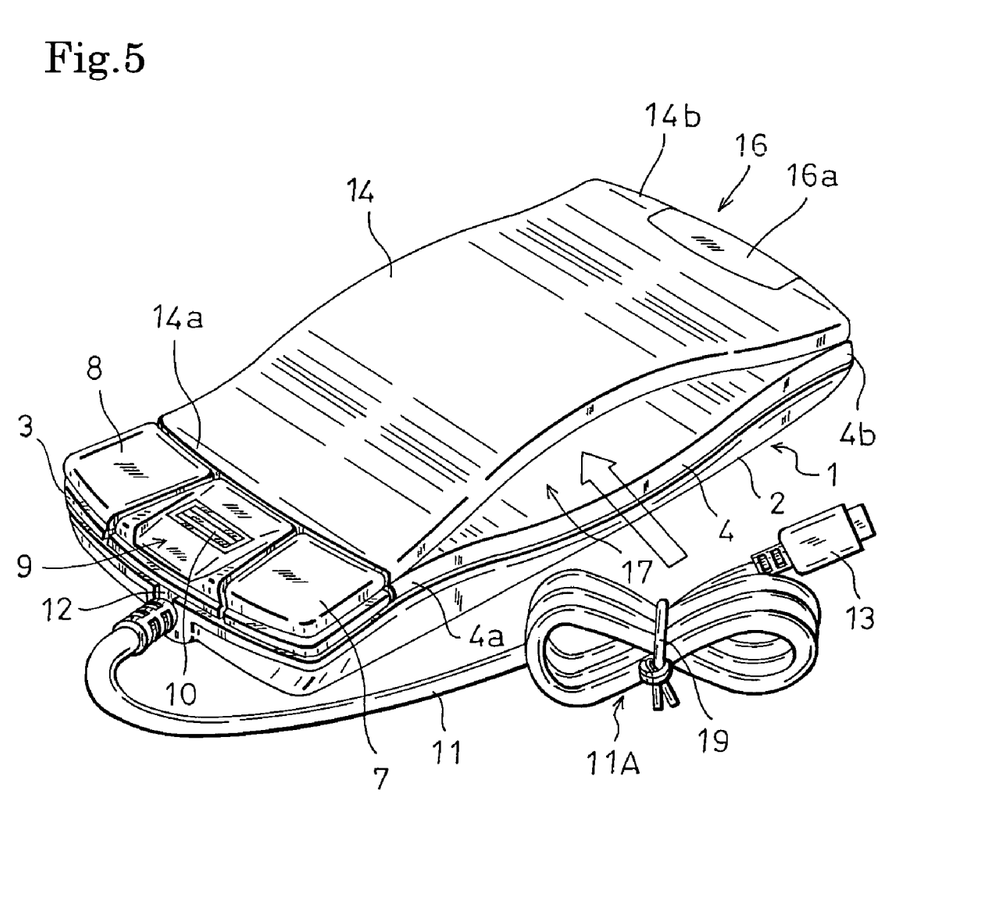
FIG. 5 is an external perspective view showing another method of treating the cable.

FIG. 5 is an external perspective view showing another method of treating the cable. In the cable treatment method shown in the figure, a substantially whole length of the cable 11 is gathered into a bundle by a bundling device 19 such as a rubber band, string, or a bundling band, and the cable bundle 11A is housed in the cavity 17 formed between the plate-like member 14 of the mouse in the use condition and the rear cover plate 4 of the mouse case 1. According to the cable treatment method, a substantially whole length of the cable 11 is housed in the mouse in the use condition, and little exposed to the outside of the mouse. Therefore, the cable 11 is hardly loosened and tangled with another article or the cable 11 itself as compared with a conventional mouse.

Figure 6:
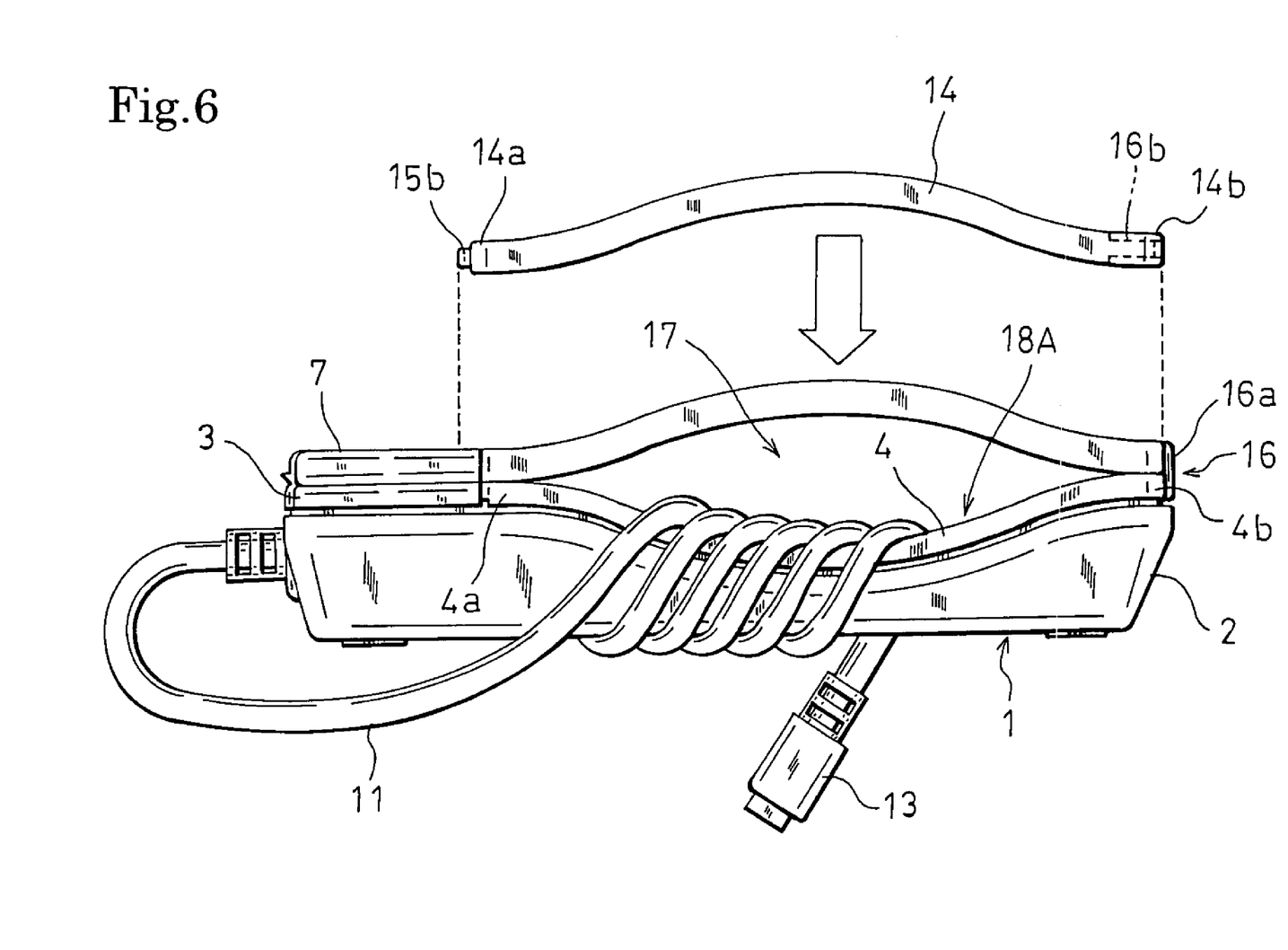
FIG. 6 is an external perspective view showing a further method of treating the cable.

FIG. 6 is an external perspective view showing a further method of treating the cable. In the cable treatment method shown in the figure, a concave 18A which is identical with the surface shape of the downward-concaved rear cover plate 4 is formed in the middle portion of the upper face of the mouse case 1 itself, and hence a substantially whole length of the cable 11 is wound around the concave 18A in the middle portion of the mouse case 1. Thereafter, the plate-like member 14 is attached in the upward-convex manner to the surface side of the rear cover plate 4 of the mouse case 1 as described above. As a result, loosening of the cable 11 wound around the mouse case 1 is prevented by the plate-like member 14 from occurring. Therefore, the cable 11 is hardly loosened and tangled with another article or the cable 11 itself as compared with a conventional mouse.

The cable treatment methods shown in FIGS. 5 and 6 are conducted on the mouse in the use condition, and suitable particularly for the case of nonuse of the mouse. Since the cable 11 can be adequately treated as compared with a conventional mouse, it can be said that the portability of the mouse can be improved.

In the above, an example of preferred embodiments of the invention has been described. The invention is not restricted to this, and may be modified and applied to any mouse within a range not departing the spirit and scope of the invention.

In the embodiment, for example, the optical mouse according to the USB standard and having the fingerprint authenticating mechanism has been described. However, it is matter of course that the invention can be applied also to a mechanical mouse which mechanically detects a coordinate position with using a track ball and an encoder, a wireless mouse which is connected to a computer by means of infrared rays or radio waves, a mouse with a scroll function in which a wheel for performing the scroll operation on a computer screen is rotatably disposed on a mouse case, and the like.

What is claimed is:

1. A mouse, comprising:
a thin mouse case having an upper face portion formed into a downward-concaved shape; and
a plate-like member detachably mounted to said thin mouse case and having a shape which extends along said downward-concaved upper face portion of said thin mouse case, said plate-like member being attachable to said thin mouse case so that its shape coincides with the downward-concaved upper face of said thin mouse case and attachable to said thin mouse case so that its shape assumes an upward-convex direction relative to the downward-concave direction of said thin mouse case.

2. The mouse according to claim 1, wherein:
the shapes of said downward-concaved upper face portion of said thin mouse case and said plate-like member are the same arch shapes which are overlappable with each other in a close contact state.

3. The mouse according to claim 1, wherein:
an engaging concave portion or an engaging convex portion is disposed in plural peripheral places of one of said downward-concaved upper face portion of said thin mouse case and said plate-like member; and
an engaging convex portion or an engaging concave portion which is fittable with said engaging concave portion or said engaging convex portion is disposed in plural peripheral places of another one of said downward-concaved upper face portion and said plate-like member.

4. The mouse according to claim 1, wherein:
said thin mouse case is configured by: a lower case in which side plates are raised from side edges of a bottom plate; a front upper cover which covers a front end portion of an upper face of said lower case; and a rear upper cover which covers an upper face of said lower case that is behind said front upper cover; and two operation buttons are disposed on an upper face of said front upper cover, and a cable in which a connector plug is disposed at a tip end is drawn out from a front side face of said lower case.

5. The mouse according to claim 1, wherein:
said thin mouse case is configured by: a lower case in which side plates are raised from side edges of a bottom plate; a front upper cover which covers a front end portion of an upper face of said lower case; and a rear upper cover which covers an upper face of said lower case that is behind said front upper cover;
two operation buttons are disposed on an upper face of said front upper cover, a cable in which a connector plug is disposed at a tip end is drawn out from a front side face of said lower case, said rear upper cover has a horizontal portion in front and rear end portions; and
a portion of said rear upper cover which is between said front and rear horizontal portions is formed into a downward-concaved shape.

6. The mouse according to claim 1, wherein:
said thin mouse case is configured by: a lower case in which side plates are raised from side edges of a bottom plate; a front upper cover which covers a front end portion of an upper face of said lower case; and a rear upper cover which covers an upper face of said lower case that is behind said front upper cover;
two operation buttons are disposed on an upper face of said front upper cover, a cable in which a connector plug is disposed at a tip end is drawn out from a front side face of said lower case, said rear upper cover has a horizontal portion in front and rear end portions, a portion of said rear upper cover which is between said front and rear horizontal portions is formed into a downward-concaved shape, said plate-like member extends along a surface of said rear upper cover, and has a horizontal portion in front and rear end portions in a state where said member is overlappable in a close contact state with said surface of said rear upper cover; and
a portion of said plate-like member between said front and rear horizontal portions is formed into a downward-concaved shape.

7. The mouse according to claim 1, wherein:
said thin mouse case is configured by: a lower case in which side plates are raised from side edges of a bottom plate; a front upper cover which covers a front end portion of an upper face of said lower case; and a rear upper cover which covers an upper face of said lower case that is behind said front upper cover;
two operation buttons are disposed on an upper face of said front upper cover, a cable in which a connector plug is disposed at a tip end is drawn out from a front side face of said lower case, said rear upper cover has a horizontal portion in front and rear end portions, a portion of said rear upper cover which is between said front and rear horizontal portions is formed into a downward-concaved shape, said plate-like member extends along a surface of said rear upper cover, and has a horizontal portion in front and rear end portions in a state where said member is overlappable in a close contact state with said surface of said rear upper cover;
a portion of said plate-like member between said front and rear horizontal portions is formed into a downward-concaved shape, a horizontally lateral front engaging concave portion is disposed in a rear side face of a protrusion which is disposed on said upper face of said front upper cover and between said two operation buttons, a horizontally lateral front engaging convex portion which is fittable with said front engaging concave portion is disposed in a front end face of said plate-like member opposing said rear side face of said protrusion;

a rear engaging convex portion which forward protrudes is disposed on an upper end of a fixing piece which protrudes from a rear end portion of said lower case in a manner of opposing said rear side face of said protrusion;

a rear engaging concave portion which has a C-like section shape, and which is fittable with said rear engaging convex portion is disposed on a rear end portion of said plate-like member; and said plate-like member is detachably attachable to a surface side of said rear upper cover of said mouse case in both an upward-convex direction and a downward-concave direction.

* * * * *